(12) United States Patent
Callahan

(10) Patent No.: US 7,683,969 B2
(45) Date of Patent: Mar. 23, 2010

(54) SYSTEM FOR FACILITATING ERGONOMIC SUPPORT OF A CAMERA WHILE FILMING OR TAKING PICTURES

(76) Inventor: Lacey J. Callahan, 11584 Bluff Rd., Redding, CA (US) 96003

( * ) Notice: Subject to any disclaimer, the term of this patent is extended or adjusted under 35 U.S.C. 154(b) by 385 days.

(21) Appl. No.: 11/747,387

(22) Filed: May 11, 2007

(65) Prior Publication Data
US 2008/0278620 A1 Nov. 13, 2008

(51) Int. Cl.
H04N 5/247 (2006.01)
A45F 3/08 (2006.01)
A45F 3/04 (2006.01)

(52) U.S. Cl. .................. 348/376; 224/262; 224/638

(58) Field of Classification Search ............. 348/373, 348/375, 376; 224/262, 638; 396/908; 108/43
See application file for complete search history.

(56) References Cited

U.S. PATENT DOCUMENTS

| 4,967,282 | A | * | 10/1990 | Malavasi | 348/376 |
| 5,642,674 | A | * | 7/1997 | Joye et al. | 108/43 |
| 6,305,587 | B1 | * | 10/2001 | Miller | 224/153 |
| 6,764,231 | B1 | * | 7/2004 | Shubert | 396/419 |
| 6,916,124 | B1 | * | 7/2005 | Correira | 396/421 |
| 6,956,614 | B1 | * | 10/2005 | Quintana et al. | 348/373 |
| 2004/0011841 | A1 | * | 1/2004 | Sprague et al. | 224/638 |

* cited by examiner

Primary Examiner—Jason Whipkey
(74) Attorney, Agent, or Firm—Donald R. Boys; Central Coast Patent Agency, Inc

(57) ABSTRACT

A system is for supporting a camera for hands free filming includes a vest, and a camera mounting apparatus attached to the vest. In one aspect the system also includes a material overlay attached to the vest, the overlay including opposing end flaps and opposing side flaps the adjacent flap edges zippered for enabling the vest to be converted to an enclosure.

16 Claims, 4 Drawing Sheets

SYSTEM FOR FACILITATING ERGONOMIC SUPPORT OF A CAMERA WHILE FILMING OR TAKING PICTURES

CROSS-REFERENCE TO RELATED APPLICATIONS

NA

BACKGROUND OF THE INVENTION

1. Field of the Invention

The present invention is in the field of mechanical support devices for video cameras and pertains particularly to a system enabling ergonomic use of a camera 2. Discussion of the State of the Art In the field of photography there are a wide variety of still cameras and video cameras. Some cameras are very small handheld devices like more recently developed digital cameras for typical consumer use. However, many still cameras are quite large having large barrels and lens attachments, typically those used by professional photographers capturing high-resolution shots and telescopic shots of far off subjects. In video cameras, digital handy cams are typically available for consumer use. While some of these units are compact and easy to use, many units on the market are still relatively heavy if held for long periods of time.

In video camera operation, such as that of a handy cam, a user typically holds the camera with one hand, the camera typically secured to the user's hand by a hook and loop strap made adjustable for supporting the hand size of the user. The camera is typically held upright to the shoulder with the elbow of the user in a bent position. The user may operate many of the camera controls with the fingers on the hand that is strapped to the camera. After a period of time of use of the camera, the weight of the camera begins to bother most users until they either put the camera down, or attempt to change shooting positions to alleviate stress on the hand and arm.

Most handy cams include a position able LCD picture display that folds out from a tucked in position on the camera. A user may use the display to see what is being shot in real time as the user is taking pictures or otherwise filming an event. Handy cams also have a viewing aperture for viewing the shot being taken. As the cameras weight bears too great on a user during filming, it becomes difficult to hold the camera in a position that enables the user to look through the viewing aperture to ensure adequate capture of the subject. Most camera LCDs are positioned so that if the user decides to view the LCD while filming instead of the aperture, there is not enough of a change to the camera must be held to alleviate the strain of bearing the camera weight.

Tripods support devices are available for mounting the camera and positioning the camera for hands free filming, but they are hard to set up and generally cannot be moved after set up without causing jerks in the filming, for example, to elevate or lower the center of view or to pan around while filming. Particularly important for field sports is the ability to quickly move the camera to point in the direction of the action on the field. Even holding a relatively small camera, say around 12 ounces in weight, for a long period can cause strain in the arm and shoulder muscles, in the elbow, and in the wrist of many users.

Therefore, what is clearly needed is a system that allows a user to support the camera in a mobile filming position for significant periods without causing any strain on the arm, elbow, and wrist of the user.

SUMMARY OF THE INVENTION

The inventor provides a system for supporting a camera such as a video camcorder, for example, the system supporting the camera for ergonomic hands free filming. The system for supporting a camera for hands free filming includes a vest, and a camera mounting apparatus attached to the vest.

In one embodiment, the camera is a video camcorder. In one embodiment, the camera mounting apparatus includes a rigid or material hinge for attaching the mounting apparatus to the vest. In one embodiment, the vest includes diametrically opposed vest wingtips for supporting adjustable vest straps for fitting the vest to a user.

In one embodiment wherein the camera is a camcorder, the camcorder is mounted to a support base of the mounting apparatus using a hardware base attached to the support base and a hardware coupler attached to the camcorder, the coupler attached to and detached from the base using a thumb lever. In this embodiment, the camera mounting apparatus includes an adjustment system for adjusting viewing elevation angle of the camcorder in mounted position. In a variation of this embodiment, the adjustment system includes a pair of tethers and tether locks.

According to another aspect of the present invention, the system further includes a material overlay attached to the vest, the overlay including opposing end flaps and opposing side flaps the adjacent flap edges zippered for enabling the vest to be converted to an enclosure. In one embodiment, the system further includes a carry handle and a cover plate for forming a coupling with the vest wingtips to enable carrying the enclosure. In a variation of this embodiment, the cover plate is rectangular and the vest wingtips have installed grommets, the wingtips gathered and secured at the corners of the cover plate.

According to another aspect of the present invention, a method is provided for supporting a camera for hands free filming using a vest and a camera mounting apparatus attached to the vest. The method includes the steps (a) adorning the vest, (b) mounting the camera to the camera mounting apparatus on the vest, and (c) adjusting the viewing elevation angle of the mounted camera.

In one aspect of the method in step (a), the vest includes adjustable fitting straps installed vertically at the strap ends to the left and right side opposing wingtips of the vest the straps adjustable to obtain a secure fitting of the vest to a user. In one aspect, in step (b), the camera is a camcorder mounted to a support base of the mounting apparatus using a hardware base attached to the support base and a hardware coupler attached to the camera, coupling accomplished by engaging a thumb lever to lock the coupling. In one aspect, in step (c), tethers and tether locks are provided to adjust the viewing elevation angle of the mounted camera. In this aspect, there are two tethers each attached at one end to the vest with the opposing tether ends threaded through openings in the mounting apparatus and through openings in the tether locks and knotted to prevent slip out, the tether locks functioning to grip the tethers at desired points along the length of the tethers.

According to yet another aspect of the invention, a method for converting a camera-supporting vest having diametrically opposed wingtips and a camera mounted on a camera mounting apparatus attached thereto, the vest including an attached material overlay comprising diametrically opposing end flaps and side flaps with the adjacent flap edges supporting zippers into a camera enclosure. The method includes the steps (a) zipping the opposing end and side flaps of the material overlay closed at the edges to form a rectangular enclosure, (b) gathering the vest wingtips over the top of the formed enclosure, and (c) securing a carry handle and a cover plate to grommets on the vest wingtips.

In a preferred aspect, in step (a), the enclosure is formed around the mounted camera, the mounted camera occupying the floor space of the formed enclosure. Also in this aspect, in step (b), the wingtips are gathered up at four corners of the formed enclosure and are folded over the top toward the center of the enclosure. In one aspect in step (c), the carry handle includes carry ropes threaded through openings in the cover plate and through the wingtip grommets, the rope ends secured from unthreading by retention hardware.

In a variation of the aspect described immediately above, the rope ends have grooved leads formed thereon and the retention hardware is a snap ring one used to secure each of four rope ends.

BRIEF DESCRIPTION OF THE DRAWING FIGURES

DETAILED DESCRIPTION

Figure 1:
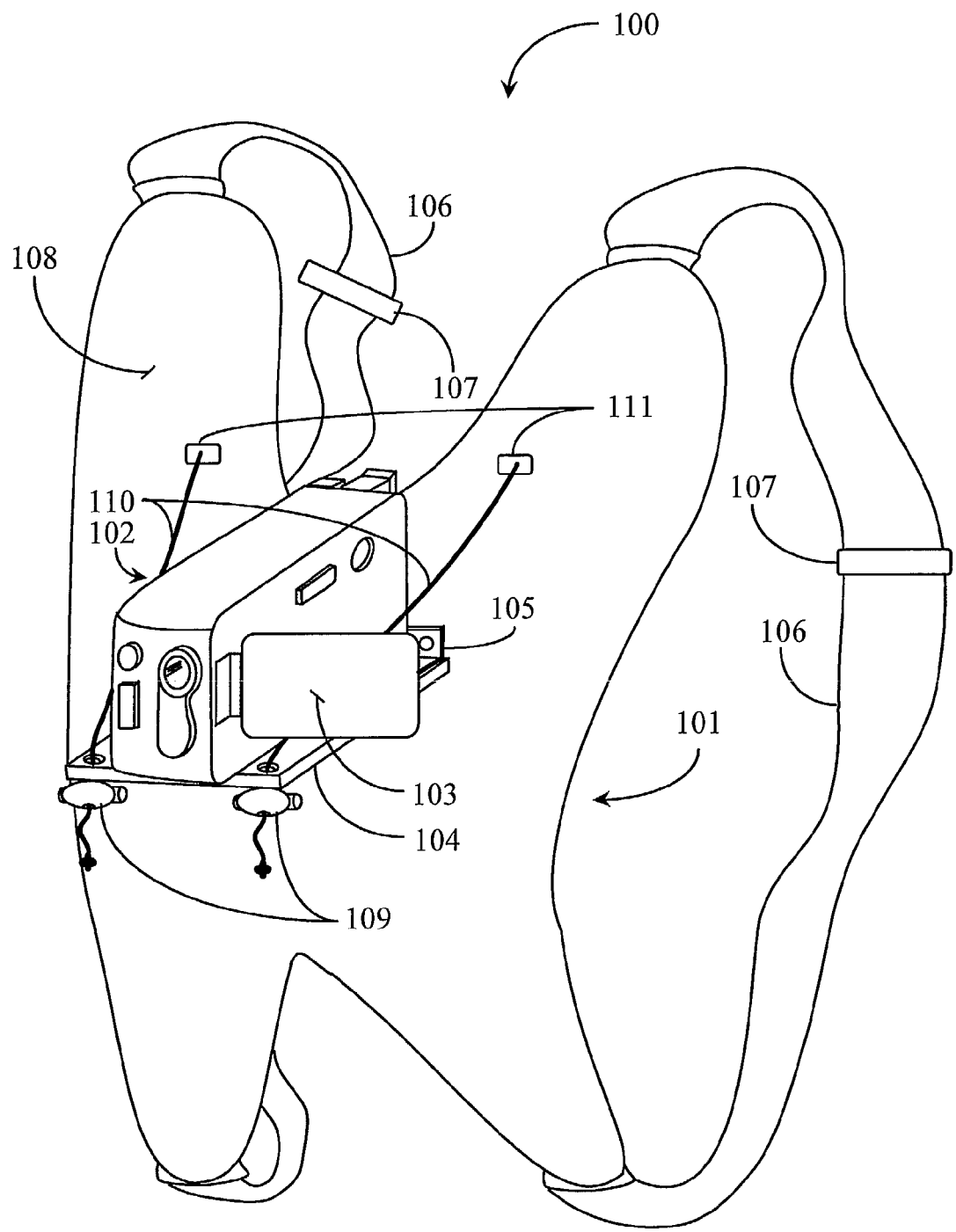
FIG. 1 is a perspective view of a video camera support system according to an embodiment of the present invention.

FIG. 1 is a perspective view of a video camera support system 100 according to an embodiment of the present invention. Support system 100 is adapted as an ergonomic system for enabling hands free support of a camera that may be maintained in a filming state while being supported.

Support system 100 includes a vest 101 that may be worn by a user. Vest 101 may be fabricated from a durable material 108 such as canvas, heavy cotton, cordura, or a host of other durable materials that may be cut and sewn or otherwise fashioned into a suitable vest form that may be comfortable worn by a user. In one embodiment, material 108 may be an overlay material sewn around a vest support underlayment (not illustrated), such as flexible plastic, cardboard, or some other material adapted to provide some rigidity to vest 101.

In this example, vest 101 is formed roughly in the shape of a butterfly having 4 distinct wings that are substantially diametrically opposed to one another, at the distal ends of which adjustable straps 106 may be attached for the purpose of enabling the vest to be fitted comfortably and securely over the shoulders and around the back of a user. Straps 106 may be fashioned of a durable material such as any of those described further above with respect to material 108. Straps 106 may be adjusted to length using adjusters 107 (one for each strap). In this example straps 106 attach to the wings of vest 101 at their opposing ends and do not cross over each other analogous to a configuration of straps one might find on a backpack. In other embodiment, other strap configurations may be applied.

Vest 101 has a camera support base 104 provided to serve as a rigid support base for supporting a camera. In this case the camera supported on support base 104 is a common video camera/recorder, also termed a camcorder 102. Support base 104 may be manufactured of a durable polymer or some other rigid but lightweight material. Support base 104 is, in this case, strategically located and affixed to the front-center portion of vest 101 using a hinge mechanism 105 adapted for the purpose.

Hinge 105 may be manufactured of a durable polymer like support base 104, or of some other suitable material like brass, steel, or some other metal. In one embodiment, a material hinge flap is provided instead of a hard plastic or metallic hinge. In this example, hinge 105 may be mounted on one wing to the top surface of base 104 at the edge adjacent to vest 101 and on the opposing hinge wing to the surface of vest 101 so that support base 105 may hang down vertically when not used to support a camera. The method of attaching support base 104 to vest 101 may vary without departing from the spirit and scope of the present invention.

In the case of a material hinge flap, one edge may be sewn to vest 101 while the opposing edge may be bolted, glued, or otherwise affixed to the rear edge of support base 104. In the case of a hard plastic or metallic hinge having two opposing wings, rivets, nuts and bolts, or other hardware fastening components can be used to secure the hinge one side to vest 101 and on the other to support base 104.

When supporting a camera, support base 104 may be swung up and into a suitable position for supporting a camera, in this case camcorder 102. In this embodiment, support tethers 110 are provided to secure the adjusted support position of support base 104. Tethers 110 are anchored to vest 101 using material tether anchors 111 (one anchor for each tether end). Tether anchors 111 may be material anchors sewn in place, to which the tethers may be attached. Tether ends may be treaded through vest 101 using small grommets, for example, and anchored to the back surface of vest 101. Clips, snaps, or other mechanisms can also be used to anchor the ends of tethers 110 to vest 101. The elevation position for each tether end anchored to vest 101 is held sufficiently above the support base to enable adequate adjustment.

Tethers 110 are threaded through openings provided through support base 104 at the end of the base opposite the hinge placement location. The un-anchored tether ends are then threaded through tether locks 109 (one for each tether) and knotted on the ends to prevent them from coming back through the tether locks. Tether locks 109 may be plastic locks, wooden locks, or locks made of some other rigid material. Each tether lock in this example includes a lock pin (which may be spring loaded) for activating the lock to grip the tether at any position along the tether. In this case, the tether lock body has a through opening and the lock pin, a similar through opening that align during use enabling the tether to slide through the lock when lock 109 is not in a locking position. Pushing in on the lock pin locks the tether lock in position on the tether via forced displacement of the through opening alignments.

The overall length of tethers 110 is sufficient to allow for base 104 to hang vertically along the surface of vest 101 when not supporting camera 102, at least for filming. However, if a user is filming the ground for any reason, a vertical hang may be an appropriate position for filming.

In use, a user may elevate support base 104 with camcorder 102 by physically raising the base with one hand and sliding tether lock pins 109 up each tether until the base can be released resting on the lock pins in the desired position. Further minor adjustments may be made as required to establish the best viewing angle for filming. The exact viewing angle desired may very according to the type of venue being filmed.

Camera 102 may be mounted to support base 104 using hardware or it may be strapped into place using a hook and loop connection engineered into one or more straps (not illustrated). Camcorder 102 has a display screen 103 that flips open for screen viewing. Screen 103 may be used as a viewfinder instead of looking through the camera eyepiece when filming on the support base for convenience. Some camcorders have angularly adjustable eyepieces that would, if positioned correctly, allow a user to viewing through the eyepiece while the camera is being supported on base 104 in a position for filming. However, using the display screen as a viewing window is convenient because most flip open screens may be tilted up toward the user for better viewing.

In practice of the present invention, a user may adorn vest 101 and mount a camera such as camcorder 102 to the support plate 104 attached to the front of the vest. After attaining the correct viewing elevation angle, the user may continue filming hands free accept for minor hands on adjustments like zoom, or other video taping or still picture functions. With the camera at rest supported by plate 104, the user no longer has to hold the camera in an upright filming position that may cause undue strain on the arm and wrist of the user.

Figure 2:
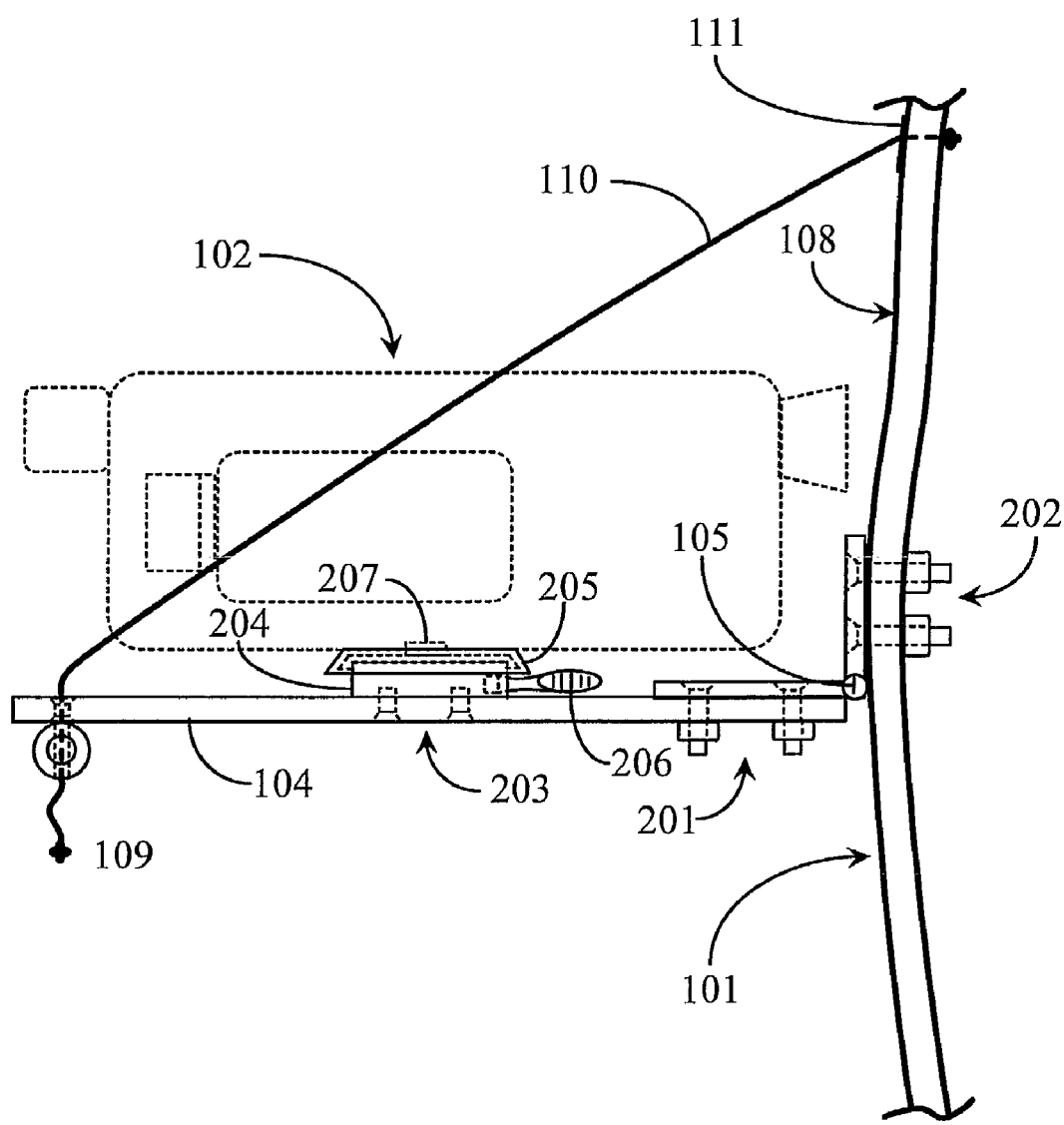
FIG. 2 is a side view of the system of claim 1.

FIG. 2 is a partial right side view of system 100 of claim 1. In this view, vest 101 is illustrated only partially to show attachment locations for tethers 110 and hinge 105. Camcorder 102, shown in dotted outline for reference, may be mounted to camera support base 104 using mounting hardware as was previously described. In this embodiment, a hardware base 204 is provided similar to one that is available for mounting a camcorder to a tripod, for example. A mating hardware coupler 205 is similarly provided. Coupler 205 may be mounted to the underside of camcorder 102 using a cap screw 207. Most camcorders contain a threaded recess adapted for the purpose of accepting the screw as is standard for tripod mounting.

Hardware base 204 may be mounted to support base 104 using bolts 203. Any suitable bolt pattern may be used. Hardware base 204 contains a lever actuated lock plate (not illustrated) that may be activated or deactivated using a thumb lever 206. The space between the bottom surface of camcorder 102 and the top surface of support base 104 when the camcorder is mounted to the support base is large enough to enable a user to access lever 206 using a thumb or finger to lock the camcorder onto the support base or to disengage the camcorder from the support base.

Hinge 105 is illustrated in mounted position using on support base 104. In this example nuts and bolts 201 are provided as fasteners. Likewise, the other wing of hinge 105 is mounted through vest 101 using a similar nut and bolt combination 202. A back plate with through openings for accepting bolts 202 may be provided on the rear surface of vest 101 to provide additional support for mounting support base 104 to the vest.

Tethers 110 may be cords, leather straps, lightweight bead chain, or some other tether type. In this example, tethers 110 are threaded through material wall 108 and are knotted at the rear surface of vest 101. Tether anchors 111 provide additional support for attaching the tethers to the vest in a secure manner. It is noted herein that the adjustment mechanism using tethers 110 and sliding tether locks 109 is not absolutely required in order to practice the present invention, but represents just one mechanism of other possible mechanisms that could be employed to adjust mounted camcorder 102 to a desired filming elevation. In an alternate embodiment, a mechanism comprising telescopic rod adjusting arms could be mounted underneath support base 104, attaching to vest material wall 108 for lifting the support base to the desired elevation by telescoping the rods and locking them into a desired position. Such telescopic rods might be disengaged when collapsing support base 104 to hang vertically against vest 101 when not filming or if filming the ground.

Figure 3:
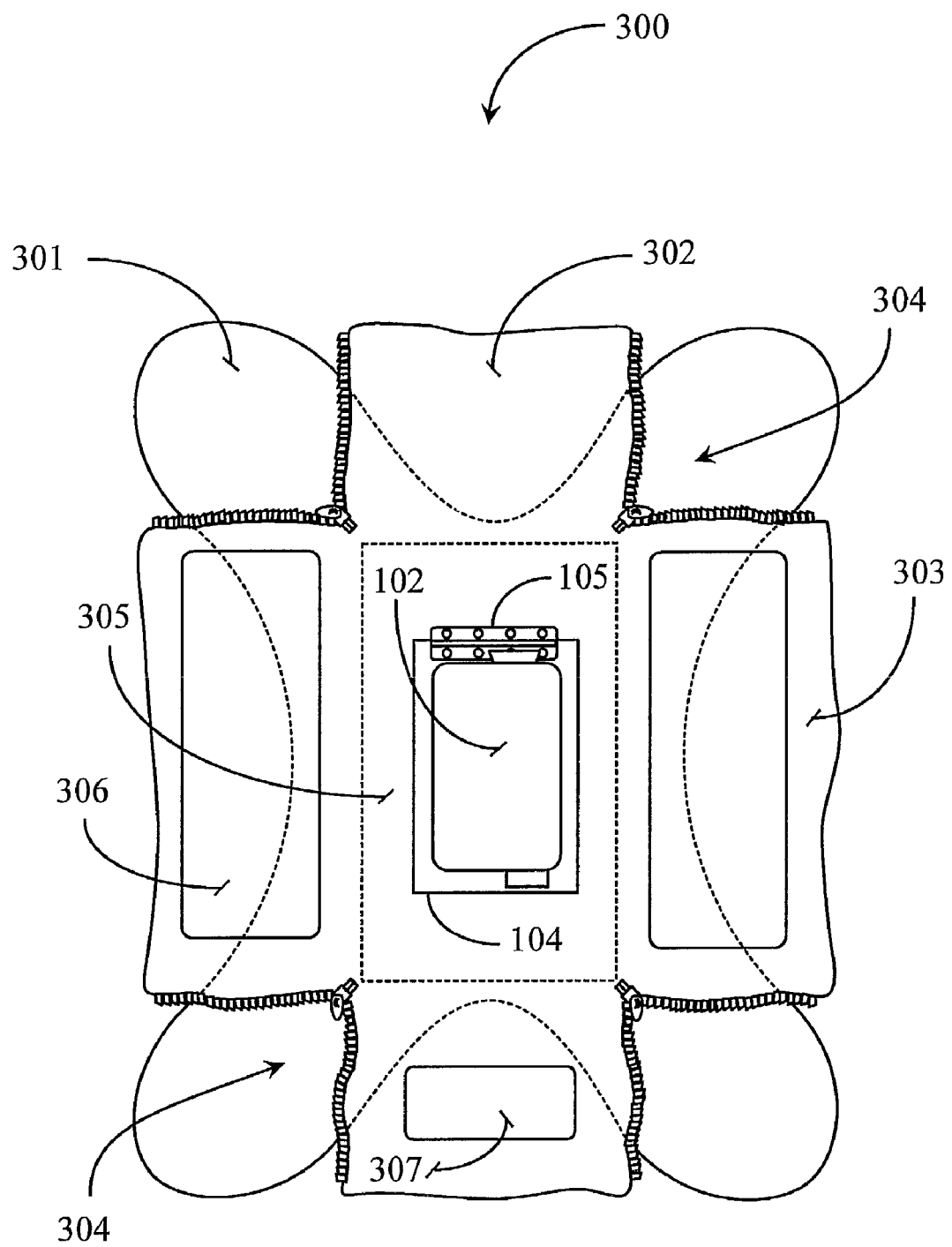
FIG. 3 is an overhead view of a video camera support system according to another embodiment of the present invention.

FIG. 3 is an overhead view of a camera support system 300 according to another embodiment of the present invention. Camera support system 300 is adapted to be used both as a support vest and as a handy camera-carry bag when not in use for ergonomic filming. Support system 300 includes a butterfly shaped vest portion 301 analogous to vest 101 described further above. On the camera-mounting surface of the vest, additional material is sewn or otherwise fastened to the vest in the form of diametrically opposed rectangular flaps comprising two end flaps 302 and two side flaps 303. Side flaps 302 and end flaps 303 are formed of one contiguous piece of material having a rectangular opening 305 substantially centered in the pattern so that the camera support base 104, hinge 105, and mounted camcorder 102 are not obstructed in any way from normal use.

When vest 301 is in use, material flaps 302 and 303 remain splayed out as illustrated in this view. Adjustable straps for fitting vest 301 to a user are not illustrated in this embodiment, but may be assumed present. The vest may be worn in the same fashion as was described with reference to vest 101. Vest 301 may have grommets or rings (not illustrated here) installed at the distal ends of each protruding wing of the vest so that the wing tips of vest 301 may be gathered together and secured to support a carry handle apparatus as will be described later in this specification.

In this embodiment, a notch representing corner space in between flaps demarks each rectangular flap. The edges of each adjacent flap have zippers 304 installed so that the flaps may be zipped together to form the rectangular sides of an enclosure. Zippers 304 may be metallic zippers I a preferred embodiment. In this example, rectangular opening 305 may define the floor of the rectangular enclosure created when each of the 4 zippers is zipped closed. In this example, material flaps 302 and 303 are sewn onto the front surface of vest 301 so that when zippers 304 are zipped closed and the enclosure is thus formed, the wingtips are gathered to each of the four corners of the enclosure. In this position, they may be folded in over the top of the enclosure and may be incorporated for facilitating carrying of the enclosure with the camcorder mounted inside.

In one embodiment, rectangular opening 305 is roughly the same size and orientation as the floor of the enclosure. In this light, there may be a semi flexible insert embedded into vest 301 like a plastic or cardboard insert to help define the floor area of the enclosure and to provided some rigidity to prevent the floor space from bowing or collapsing in with the contents inside.

In one embodiment, rectangular flaps 302 and 303 are adapted with material pockets that may be used to store video and picture recording components and accessories. For example, flap 302 at the bottom of this view has a pocket 307 sewn or otherwise fastened thereto and adapted to contain one or more video recording tapes. Flaps 303 each have a pocket 306 sewn or otherwise attached thereto and adapted for holding cables, straps and other like components that may need to be stowed when not being used. Pockets may also be provided for holding memory cards, hardware, and like components.

Figure 4:
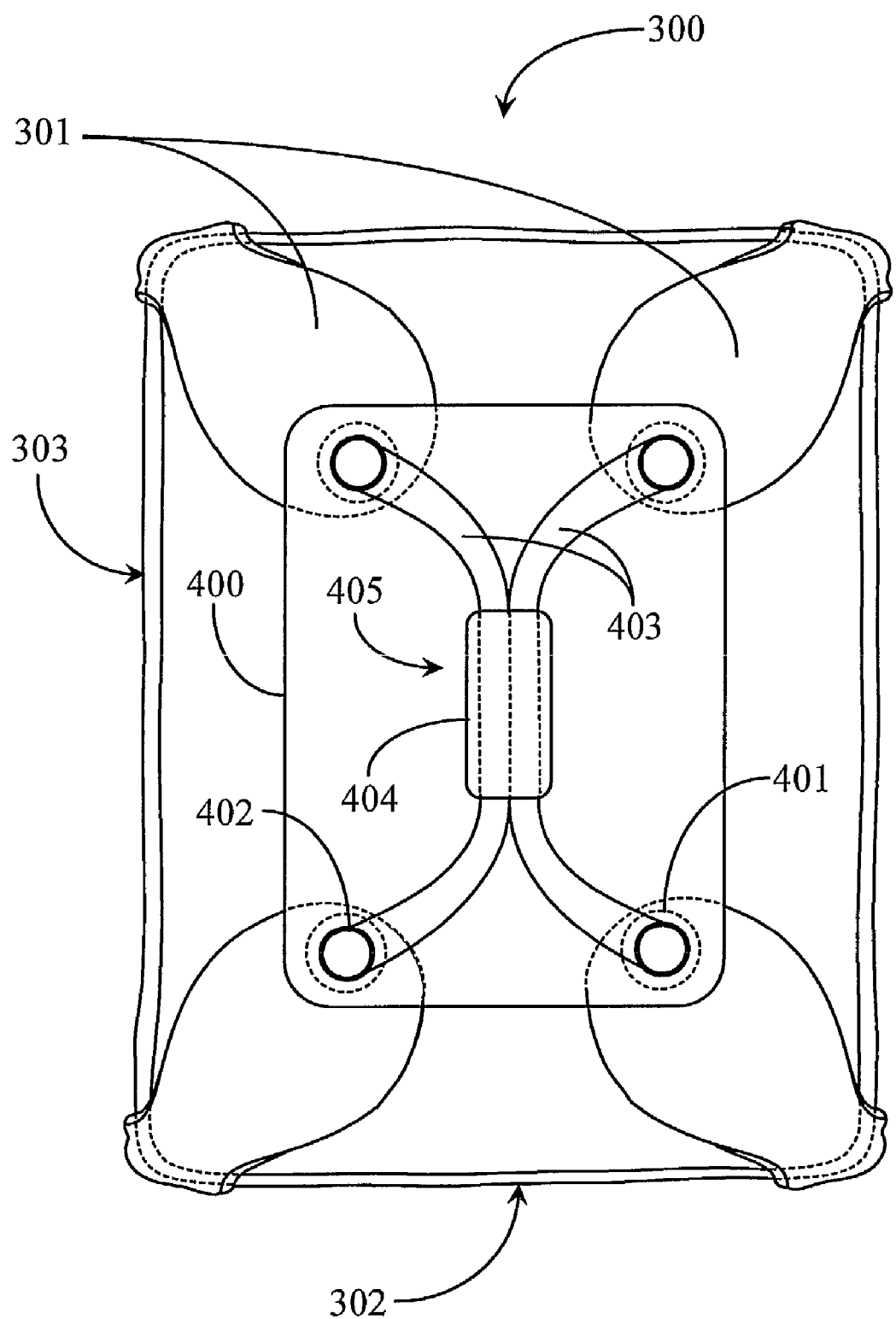
FIG. 4 is an overhead view of the system of FIG. 3 converted to a carry bag.

FIG. 4 is an overhead view of system 300 of FIG. 3 converted to a carry bag according to an embodiment of the present invention. Ergonomic camera support system 300 is illustrated in this view with zipper elements zipped closed to form a substantially rectangular enclosure having end walls 302 and sidewalls 303. The wing tips of vest 301 are folded over the top of the enclosure. In this embodiment, each wingtip has a grommet 402 sewn or otherwise fastened to the material, the grommet providing an opening through which the free ends of a carry handle 405 may be inserted. Grommets 402 may be metallic grommets or plastic grommets similar to those used for tie-down locations on plastic tarps.

A rectangular cover plate 400 is provided having openings provided there through that generally align with the grommet openings in the wingtips of vest 301 when gathered to support carrying the enclosure. Cover plate 400 may be manufactured of a durable polymer or some other rigid or semi-rigid material. In this example, cover plate 400 is generally rectangular and the overall length and width dimensions are sufficient to provide a secure installation point at the four corners for securing the wingtips of vest 301.

Carry handle 405 includes a handle bar 404 that is threaded over carry ropes 403. Handle bar 404 may be manufactured of a durable polymer, wood, aluminum, or some other durable material. Handle bar 404 may be annular, rectangular, hexagonal, or some other geometric profile. Carry ropes 403 may be made of nylon, cotton, hemp, or any other rope like material. The free ends of carry ropes 403 may include an annular form or physical lead (not illustrated) that may be adapted by annular groove to accept a retention ring 401. Handle 405 may be provided already assemble with the carry ropes and cover plate pre-assembled and ready to use.

In this example, a user may first zip each of the zippers 304 (FIG. 3) to form the enclosure. Next, the user may insert all of the free ends of carry ropes 403 through the grommets on the wingtips of vest 301 retaining the installation using retention rings 401, which may be conventional snap rings. Te user may now lift the enclosure by handlebar 404 and carry the enclosure with all of the components inside.

In one embodiment of the present invention, the carry rope ends may have snap hardware installed that snaps into snap hardware installed on each of the wingtips in place of grommets. In this way, a user would not have to keep track of any loose parts lie retention rings. Other methods of securing wingtips to carry cover 400 are possible such as having rings sewn onto the wingtips of vest 301 and latches provided one at each rope end. In one embodiment, cover plate 400 may be large enough in length and width to completely cover the top of the enclosure adding protection from weather to the components inside of the enclosure.

In one embodiment, a separate material hood (not illustrated) with an opening for accepting handle bar 404 may be provided in a shape and size to cover the top and the material sides of the enclosure down to the floor of the enclosure. The handle components and a hood if provided may be stowed in a "vest" pocket such as pocket 307 of FIG. 3 while a user is filming using the support system of the invention. In a variation of this embodiment, there may be a peripheral zipper installed around the bottom of the material hood that may be zipped to a like zipper component installed on the back surface of vest 301 around the outside perimeter of rectangular floor space 305 so that the hood may be zipped all the way around the enclosure for added protection from the weather. The hood may be pre-treated with water repellent as well as the entire support vest to inhibit wet or moldy conditions from forming in clement whether.

It will be apparent to one with skill in the art that the ergonomic camera support system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A system for supporting a camera for hands free filming comprising:
   a vest;
   a camera mounting apparatus attached to the vest;
   an adjustment system for adjusting viewing elevation angle of the camera in mounted position; and
   a material overlay attached to the vest;
   characterized in that the adjustment system includes a pair of tethers and tether locks, and further characterized in that the material overlay includes opposing end flaps and opposing side flaps, the flap edges zippered for enabling the vest to be converted to an enclosure.

2. The system of claim 1, wherein the camera is a video camcorder.

3. The system of claim 2, wherein the camcorder is mounted to a support base of the mounting apparatus using a hardware base attached to the support base and a hardware coupler attached to the camcorder, the coupler attached to and detached from the base using a thumb lever.

4. The system of claim 1, wherein the camera mounting apparatus includes a rigid or material hinge for attaching the mounting apparatus to the vest.

5. The system of claim 1, wherein the vest includes diametrically opposed vest wingtips for supporting adjustable vest straps for fitting the vest to a user.

6. The system of claim 5, further comprising a carry handle and a cover plate for forming a coupling with the vest wingtips to enable carrying the enclosure.

7. The system of claim 6, wherein the cover plate is rectangular and wherein the vest wingtips have installed grommets, the wingtips gathered and secured at the corners of the cover plate.

8. A method for supporting a camera for hands free filming using a vest and a camera mounting apparatus attached to the vest, comprising the steps:
   (a) donning the vest;
   (b) mounting the camera to the camera mounting apparatus on the vest; and
   (c) adjusting the viewing elevation angle of the mounted camera;
   wherein the viewing elevation angle of the mounted camera is adjusted using tethers and tether locks.

9. The method of claim 8, wherein in step (a), the vest includes attached adjustable fitting straps, the straps adjustable to obtain a secure fitting of the vest to a user.

10. The method of claim 8, wherein in step (b), the camera is a camcorder mounted to a support base of the mounting apparatus using a hardware base attached to the support base and a hardware coupler attached to the camera, coupling accomplished by engaging a thumb lever to lock the coupling.

11. The method of claim 8, wherein there are two tethers each attached at one end to the vest with the opposing tether ends threaded through openings in the mounting apparatus and through openings in the tether locks and knotted to prevent slip out, the tether locks functioning to grip the tethers at desired points along the length of the tethers.

12. A method for converting a camera-supporting vest having diametrically opposed wingtips and a camera mounted on a camera mounting apparatus attached thereto, the vest including an attached material overlay comprising diametrically opposing end flaps and side flaps with the adjacent flap edges supporting zippers into a camera enclosure comprising the steps:
   (a) zipping the opposing end and side flaps of the material overlay closed at the edges to form a rectangular enclosure;

(b) gathering the vest wingtips over the top of the formed enclosure; and
(c) securing a carry handle and a cover plate to grommets on the vest wingtips.

13. The method of claim 12, wherein in step (a), the enclosure is formed around the mounted camera, the mounted camera occupying the floor space of the formed enclosure.

14. The method of claim 12, wherein in step (b), the wingtips are gathered up at four corners of the formed enclosure and are folded over the top toward the center of the enclosure.

15. The method of claim 12, wherein in step (c), the carry handle includes carry ropes threaded through openings in the cover plate and through the wingtip grommets, the rope ends secured from unthreading by retention hardware.

16. The method of claim 15, wherein the rope ends have grooved leads formed thereon and the retention hardware is a snap ring one used to secure each of four rope ends.

* * * * *